(12) United States Patent
Kimura

(10) Patent No.: US 7,606,446 B2
(45) Date of Patent: Oct. 20, 2009

(54) APPARATUS, METHOD, OR STORAGE MEDIUM FOR IMAGE PROCESSING

(75) Inventor: Shinichi Kimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 623 days.

(21) Appl. No.: 11/287,256

(22) Filed: Nov. 28, 2005

(65) Prior Publication Data

US 2006/0078230 A1 Apr. 13, 2006

Related U.S. Application Data

(63) Continuation of application No. 09/547,343, filed on Apr. 11, 2000, now abandoned.

(30) Foreign Application Priority Data

Apr. 13, 1999 (JP) ............................. 11-105098

(51) Int. Cl.
G06K 9/03 (2006.01)
(52) U.S. Cl. ..................... 382/309; 382/311
(58) Field of Classification Search ................ 382/309, 382/311; 348/231.99, 231.2, 231.3, 231.7, 348/231.9
See application file for complete search history.

(56) References Cited

U.S. PATENT DOCUMENTS

| | | | |
|---|---|---|---|
| 4,888,648 A | 12/1989 | Takeuchi et al. | 358/335 |
| 5,235,680 A | 8/1993 | Bijnagte | 707/10 |
| 5,572,499 A | 11/1996 | Kohtani et al. | 369/83 |
| 5,659,639 A | 8/1997 | Mahoney et al. | 382/309 |
| 5,689,303 A | 11/1997 | Kuroiwa | 348/232 |
| 5,737,491 A | 4/1998 | Allen et al. | 704/270 |
| 6,052,692 A | 4/2000 | Anderson et al. | 707/102 |
| 6,065,015 A | 5/2000 | Kazami | 707/104.1 |
| 6,249,316 B1 | 6/2001 | Anderson | 348/333.05 |
| 6,301,586 B1 | 10/2001 | Yang et al. | 707/104.1 |

(Continued)

FOREIGN PATENT DOCUMENTS

CN 1212566 A 3/1999

(Continued)

OTHER PUBLICATIONS

European Search Report dated Mar. 22, 2006, in European Application No. 00 303 088.9.

(Continued)

*Primary Examiner*—Brian Q Le
(74) *Attorney, Agent, or Firm*—Fitzpatrick, Cella, Harper & Scinto

(57) ABSTRACT

The present invention provides an image printing apparatus in which the consistency between image files and a print information file can be held and also the efficiency of user operation can be enhanced. When an instruction to delete the relevant one of image files which are already stored in a taken image storage part in a memory card has been inputted by a file designation part, it is discriminated by a file coincidence judgement part whether or not the relevant one of the image files is present in the taken image storage part. If it is discriminated that the relevant one of the image files is present in the taken image storage part, then it is further discriminated whether or not the specified image file is already registered in print information of a print information storage part.

8 Claims, 4 Drawing Sheets

U.S. PATENT DOCUMENTS

| | | | |
|---|---|---|---|
| 6,310,647 B1 | 10/2001 | Parulski et al. | 348/231.99 |
| 6,683,649 B1 | 1/2004 | Anderson | 348/333.05 |

FOREIGN PATENT DOCUMENTS

| | | |
|---|---|---|
| EP | 0 874 519 A2 | 10/1998 |
| EP | 902589 A2 | 3/1999 |
| JP | 7-085255 | 3/1955 |
| JP | 2-300948 | 12/1990 |
| JP | 10-093903 | 4/1998 |
| JP | 11-004408 | 1/1999 |

OTHER PUBLICATIONS

European Search Report dated Jun. 20, 2002 (Ref. No. 2718930).
Chinese Official Action (with English translation) dated Jul. 4, 2003.
May 28, 2009 European Official Action in European Patent Application No. 00303088.9-2202.

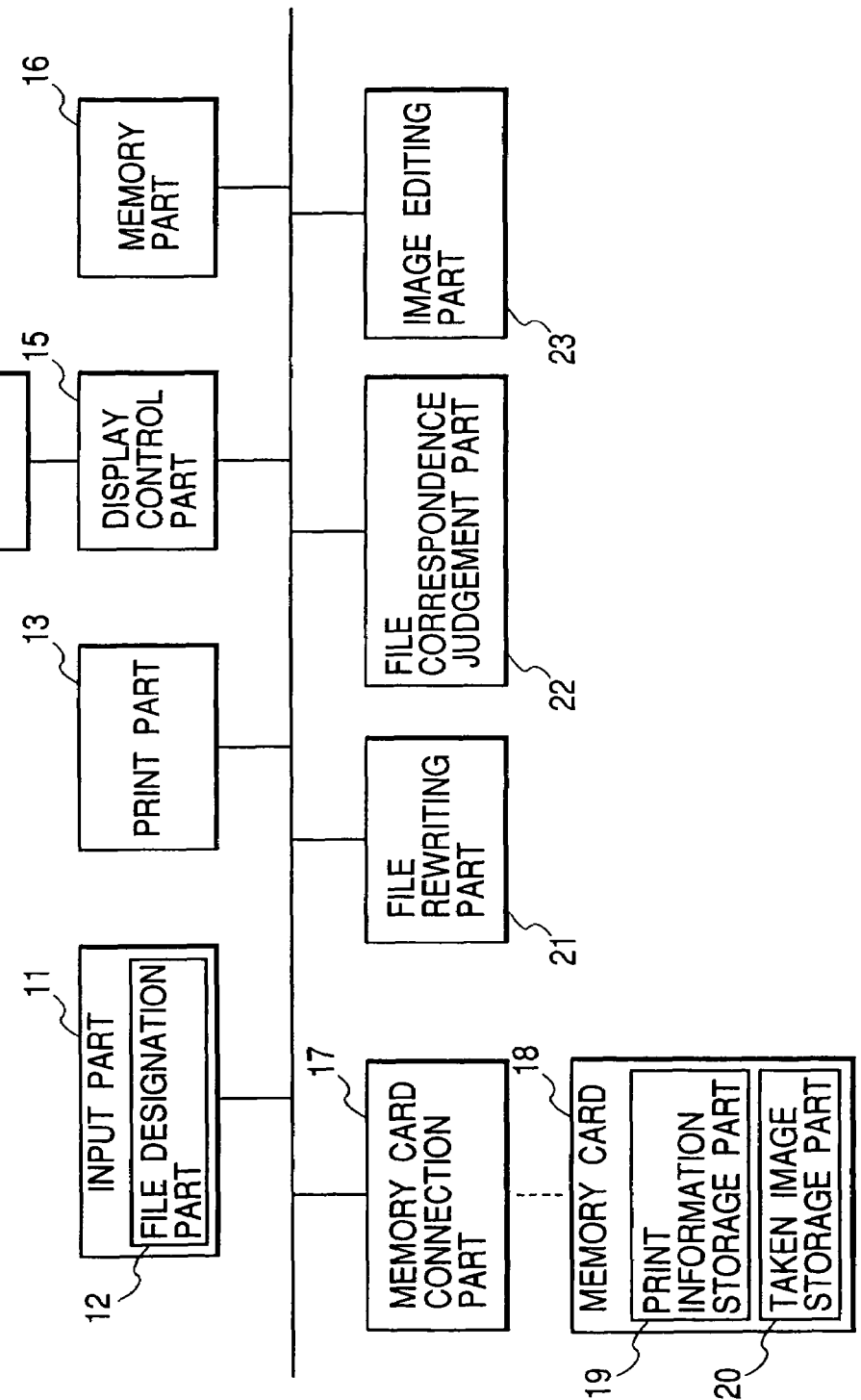

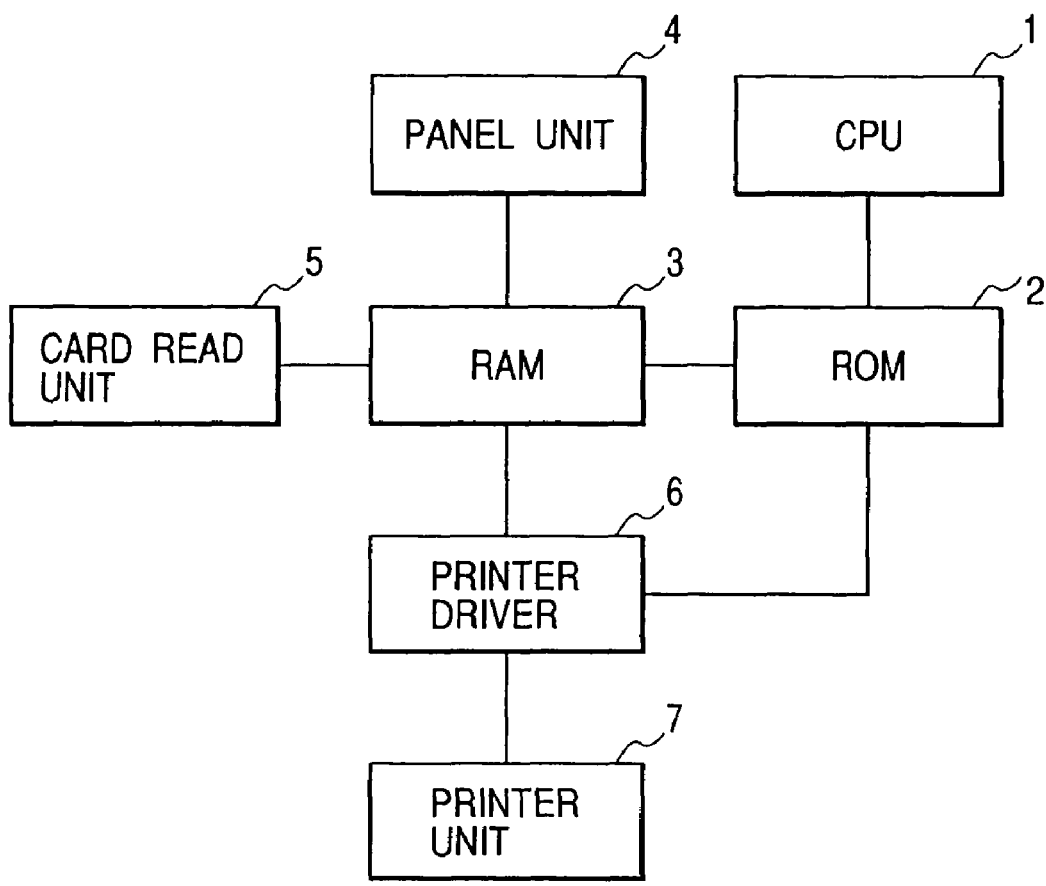

| JOB 1 | |
|---|---|
| Print Number | 1 |
| Print Size | A4 |
| Print Image | / IMG / IM01.JPG |
| Print Times | 0 |
| JOB 2 | |
| Print Number | 3 |
| Print Size | A4 |
| Print Image | / IMG / IM11.JPG |
| Print Times | 1 |
| JOB 3 | |
| Print Number | 2 |
| Print Size | A4 |
| Print Image | / IMG / IM27.JPG |
| Print Times | 0 |

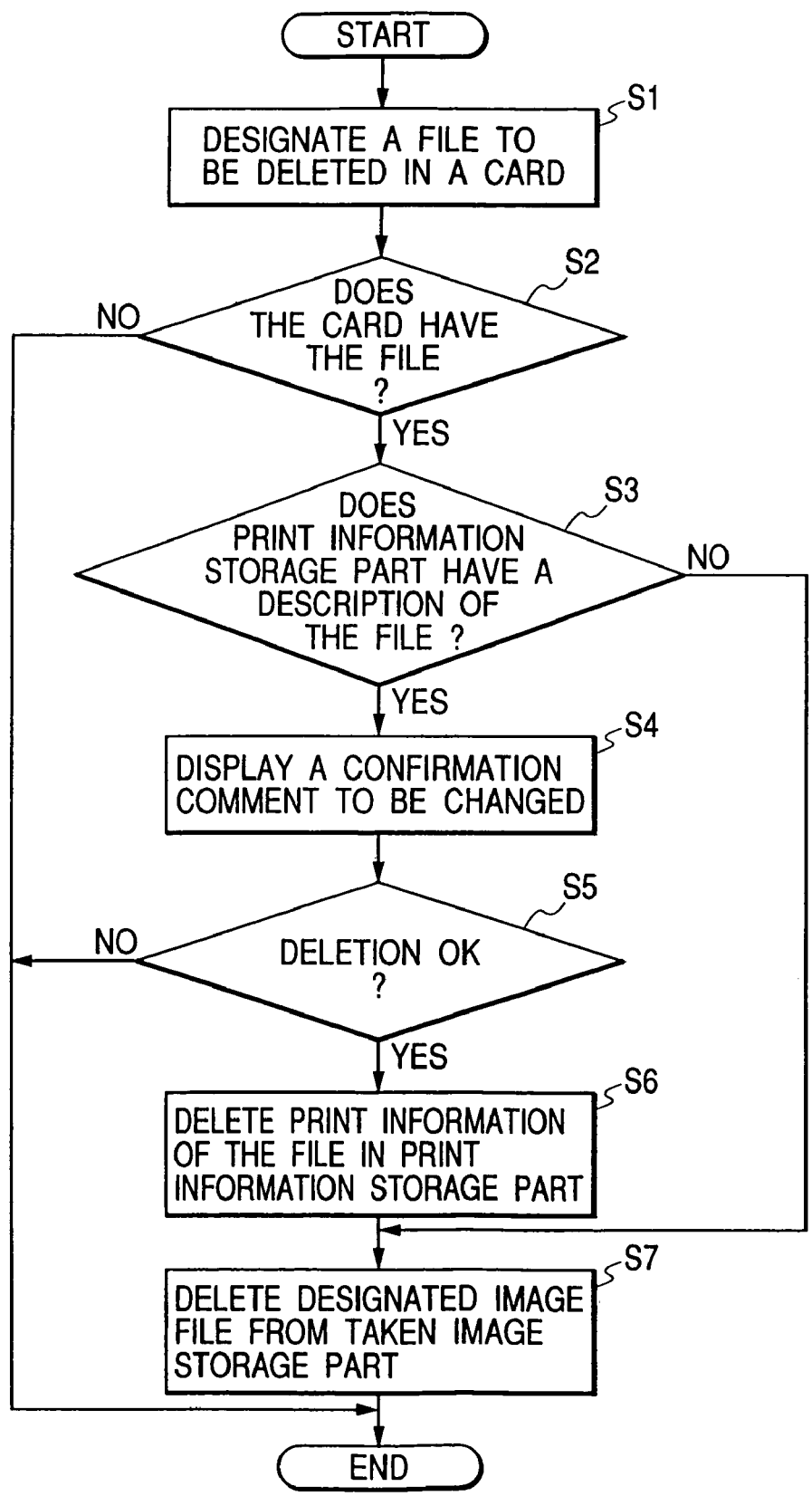

APPARATUS, METHOD, OR STORAGE MEDIUM FOR IMAGE PROCESSING

This application is a continuation of application Ser. No. 09/547,343 filed Apr. 11, 2000, now abandoned.

BACKGROUND OF THE INVENTION

1. Field of the Invention

The present invention relates to an image processing apparatus to which a memory card is attached, in which image data which has been obtained by taking a photograph of an object using a digital camera, for example, is stored in the form of an image file, in order to output the relevant one of the image files which have been stored in the memory card, and to an image processing method and a storage medium for use therein.

2. Related Background Art

In recent years, as the market for digital video cameras, digital cameras and the like has been spread, printers, each of which can be directly connected to the relevant one of the digital video camera, the digital camera and the like to take in the image data which is obtained by taking a photograph of an object using the relevant one of the digital video camera, the digital camera and the like to select a desired one of those images in order to print the desired one thus selected, have been put on the market.

In those apparatuses, it is judged to be advantageous in terms of the transfer speed and the like to employ a memory card as the means for taking in the photographed images in the digital camera. As a result, a large number of printers each having a slot for connection to the memory card have been manufactured.

In addition, recently, some of the image print systems in which those sorts of digital cameras and printers are employed are present, each of which has the function called a print mark. This print mark is the function of storing in the memory card, in which the images which have been photographed using a digital camera, the image information, such as the image number, relating to which of those images is to be printed, the print information, such as the print format, relating to in accordance with what format those images are to be printed, and the like in accordance with the file format.

In this sort of image printing system, a user can instruct the image to be printed and the print format thereof by manipulating the digital camera. The print instruction information is stored in the form of the file format in the same memory card as that in which the photographed images are already stored. Then, when printing the relevant one of the images, the memory card is attached to the printer and the print is instructed on the basis of the print instruction information in the file on the memory card.

As described above, since in the same memory card as that in which the photographed images are already stored, the print information relating to these images is stored, the print instruction does not need to be carried out on the printer side, but the information in the memory card has only to be read out to be used. As a result, the specified image can be printed with the simple manipulation for the printer.

In addition, since there is no necessity of carrying out the various kinds of input operations, this function can be realized even in the printer which is obtained by simplifying an input device and which has the relatively inexpensive construction. Heretofore, this function is known as the Universal Standard entitled Digital Print Order Format (DPOF) (in application for the trademark registration).

However, in such an image print system, in the case where after the print information has been temporarily inputted to be written in the form of a file to the memory card, the relevant one of the image files in the memory card is edited, the editing is carried out without judging whether or not that the relevant one of the image files is the image file which has been specified in the print information. Therefore, even if the edited image file is the image file which has been specified in the print information, the changed contents thereof are not reflected to the print information at all.

For example, in the case where after a user has produced the print information to store temporarily the print information thus produced in the memory card by manipulating the memory card by a user, he/she deletes the image file for which the print has been specified, the information relating to the deletion thus carried out is not reflected to the print information unless a user resets that image file. Therefore, there is the possibility that the deleted information becomes the improper print information as apparent, for example, from the case where the image file which is absent as the print information is specified.

In the light of the foregoing, the present invention has been made in order to solve the above-mentioned problems associated with the prior art, and it is therefore an object of the present invention to provide an image processing apparatus, an image processing method, and a storage medium for use therein, in each of which, when editing an image file, the consistency between the image files and an output information file can be held without resetting the information relating to that editing by a user and also the high efficiency for a user's manipulation can be promoted.

In addition, it is another object of the present invention to provide an image processing apparatus, an image processing method, and a storage medium for use therein, in each of which it is possible to prevent a user from carrying out the editing processing by mistake.

SUMMARY OF THE INVENTION

In order to attain the above-mentioned objects, according to one aspect of the present invention, there is provided an image editing apparatus for reading out output information from a recording medium in which together with image files, the output information of the image files is recorded to output the relevant one of the image files, the apparatus including: editing instructing means for instructing the editing of relevant one of image files which are recorded in the recording medium; discrimination means for discriminating whether or not the image file for which the editing has been instructed matches the image file for which the output has been instructed within the output information; rewriting means for when the image file for which the editing has been instructed matches the image file for which the output has been instructed within the output information, rewriting the output information which is recorded in the recording medium in accordance with the editing contents; and editing means for editing the relevant one of the image files.

BRIEF DESCRIPTION OF THE DRAWINGS

FIG. 1 is a block diagram showing a schematic configuration of a printer according to an embodiment of the present invention;

FIG. 2 is a block diagram showing an electrical configuration of a printer according to the present invention;

FIG. 3 is a diagram showing the structure of image files which are stored in a memory card 18 shown in FIG. 1;

FIG. 5 is a flow chart showing a procedure of executing a deletion processing in a file editing processing.

DESCRIPTION OF THE PREFERRED EMBODIMENTS

Figures 4, 6:
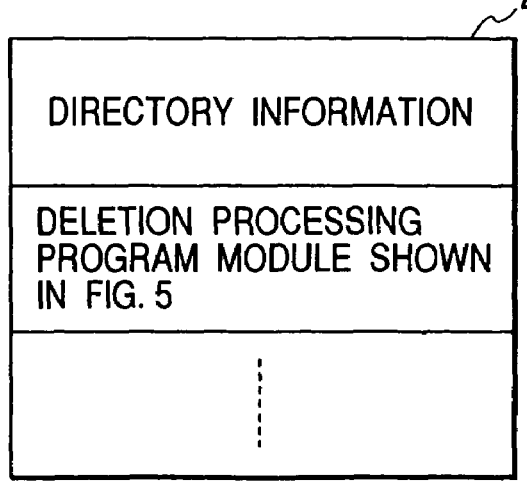
FIG. 4 is a diagram showing print information which is stored in a print information storage part 19 of a memory card 18 shown in FIG. 1.
FIG. 6 is a diagram showing a memory map of a ROM 2 as a storage medium according to the present invention.

The preferred embodiments of an image processing apparatus, an image processing method and a storage medium for use therein according to the present invention will hereinafter be described in detail with reference to the accompanying drawings.

The image processing apparatus in the preferred embodiments is mainly applied to a printer. While the preferred embodiment of a printer of the present invention will hereinafter be described, the present invention is not limited to the printer. For example, the present invention may also be applied to a display.

FIG. 1 is a block diagram showing a schematic configuration of a printer according to an embodiment of the present invention. In the figure, reference numeral 11 designates an input part which serves to carry out the input of a print instruction issued from a user. A file designation part 12 is provided in the input part 11 and instructs the processing of editing a relevant one of images which are already stored in a taken image storage part 20 on a memory card 18. A print part 13 is constituted by a motor for moving a printing head and for feeding papers one after another, the printing head for carrying out printing, and the like, and executes the processing of carrying out the printing of the information to a paper.

Reference numeral 15 designates a display control part which serves to display information of error occurrence in a printer, the information relating to confirmation of the manipulator, and the like on a display part 14. Reference numeral 16 designates a memory part which is utilized as a buffer, for use in the editing processing, for storing therein the various kinds of processing programs and storing therein the relevant one of the images for use in the editing.

Reference numeral 17 designates a memory card connection part which is attached to a digital camera or the like and through which a memory card in which the photographed images and the print information relating thereto are already stored is attached to the printer. Reference numeral 18 designates a memory card which is removably attached to the printer, and which has in the inside thereof a taken image storage part 20 for storing therein the photographed images and a print information storage part 19 for storing therein the print information relating to the photographed images.

Reference numeral 21 designates a file rewriting part which serves to rewrite the image file which is stored in the taken image storage part 20 and which has been specified by a file designation part 12 provided in the input part 11, and the print information which is stored in the print information storage part 19.

A file correspondence judgement part 22 for judging correspondence between files judges whether or not the image file for which the editing has been specified by the file designation part 12 is present in the taken image storage part 20, or whether or not the specified image file is registered as the object to be printed in the print information on the print information storage part 19.

An image editing part 23 edits the relevant one of the image files which has been specified by the file designation part 12. The editing includes the deletion of an image, the change of a storage directory or a file name, and the like.

FIG. 2 is a block diagram showing an electrical configuration of the printer. The printer is constituted by a CPU 1, a ROM 2, a RAM 3, a panel unit 4, a card read unit 5, a printer driver 6 and a printer unit 7. The panel unit 4 has the functions of the input part 11 and the file designation unit 12. The card read unit 5 has the function of the memory card connection part 17. In addition, the functions of the parts such as the file rewriting part 21, the file correspondence judgement part 22 and the image editing part 23 are realized by executing the program, which is stored in the ROM 2, by the CPU 1.

FIG. 3 is a diagram showing a structure of the image files which are stored in the memory card 18. In this case, the list of the image files is shown in accordance with the directory format. As shown in the figure, in the taken image storage part 20 of the memory card 18, nine image files (IM01.JPG, IM02.JPG, . . . , IM34.JPG) are stored under the IMG directory.

FIG. 4 is a diagram showing the print information which is stored in the print information storage part 19 included in the memory card 18. Each print information is constituted in units of JOBs. Then, the print number, the print image and the like can be set for each JOB. Since the print image is stored in accordance with the format shown in FIG. 3, as shown in the item of "Print Image" in the figure, the print image is specified by the full-pass. In addition, in the present embodiment, the number of JOBs as the unit of the print is three, and these JOBs are set in such a way as to be printed in accordance with the respective contents shown in FIG. 4. In general, the print information is updated by the operation of specifying the print image by a user using the image input device such as a digital camera.

FIG. 5 is a flow chart showing the procedure of executing the deletion processing in the file editing processing. This processing program is stored in the ROM 2 and is executed by the CPU 1. As has already been described, the image files having the structure shown in FIG. 3 are stored in the taken image storage part 20 shown in FIG. 1. Then, the deletion processing is executed for these image files.

First of all, at the time when an instruction to delete the relevant one of the image files which are stored in the taken image storage part 20 provided in the memory card 18 has been inputted from the file designation part 12 (Step S1), it is discriminated by the file coincidence judgement part 22 whether or not the relevant one of the image files is present in the taken image storage part 20 (Step S2).

Since it is discriminated in Step S2 that the relevant one of the image files is not present in the taken image storage part 20, the deletion processing cannot be executed, so this processing is completed. On the other hand, when it is discriminated in Step S2 that the relevant one of the image files is present therein, it is further discriminated whether or not the specified image file is already registered as the object to be printed in the print information of the print information storage part 19 (Step S3). For example, when /IMG/IM27.JPG is specified as the image file to be deleted, since the relevant one of the image files is present in the taken image storage part 20 as shown in FIG. 3, it is discriminated whether or not the relevant one of the image files is present in the print information shown in FIG. 4. Since the relevant one of the image files becomes the object to be printed in JOB3, it is discriminated in Step S3 that the specified image file is already registered as the object to be printed in the print information of the print information storage part 19 (YES).

When the relevant one of the image files is registered as the object to be printed in such a manner, it is confirmed whether or not the deletion processing may be really executed. That is, the fact that the relevant one of the image files becomes the object to be printed in the print information file is displayed on the display part 14 and then a comment for confirmation is reported to a user (Step S4), and then an input of the confirmation relating to whether or not the deletion processing may be executed is accepted (Step S5).

When the input of the confirmation relating to the effect that the deletion processing may be executed is accepted, the JOB, including the image file for which the deletion has been specified, of the JOBs of the print information which has been stored in the print information storage part 19 is deleted by the file rewriting part 21 (Step S6). In this case, the print information relating to JOB3 including /IMG/IM27.JPG is deleted. Thereafter, the specified image file is deleted from the taken image storage part 20 by the image editing part 23 (Step S7).

On the other hand, when the deletion processing is rejected in Step S5 as a result of requesting a user to carry out the confirmation, the deletion processing is stopped to complete the processing.

Also, on the other hand, when it is discriminated in Step S3 that the relevant one of the image files is not yet registered as the object to be printed in the print information of the print information storage part 19, only the image file which has been specified in Step S7 is deleted from the taken image storage part 20 by the image editing part 23.

In such a manner, since in the printer according to the present embodiment, the result of executing the editing processing for the relevant one of the image files which has been registered as the object to be printed in the print information is reflected to the print information file at once, the consistency between the image files and the print information file can be held, any of the errors in executing the processing can be prevented from occurring and the operability for users can be enhanced.

In addition, when the image file for which the editing is intended to be carried out is present as the object to be printed in the print information, since after having requested a user to carry out the confirmation, the editing is carried out, the editing processing becomes free from any of the errors. As a result, the operability for users can be enhanced.

In this connection, the present invention may be applied to either a system which is constituted by a plurality of apparatuses or a system which is constituted by one apparatus. In addition, it is to be understood that the present invention may also be applied to the case where the present invention can be attained by supplying either a system or an apparatus with a suitable program. In this case, the information in the storage medium in which the program is stored which is represented by the software for attaining the present invention is read out to either a system or an apparatus, whereby either the system or the apparatus can have the effects of the present invention.

FIG. 6 is a diagram showing a memory map in the ROM 2 as the storage medium. A deletion processing program module shown in the flow chart of FIG. 5, and the like are stored in the ROM 2. The storage medium for supplying the program module is not limited to a ROM. That is, alternatively, for example, a floppy disk, a hard disk, an optical disk, a magneto-optical disk, a CD-ROM, a CD-R, a DVD, a magnetic tape, a non-volatile memory card or the like may also be employed therefor.

As set forth hereinabove, according to the present invention, when editing an image file, the consistency between the image files and a print information file can be held without resetting the information relating to the editing by a user, and hence the efficiency of user operation can be enhanced. In addition, it is possible to prevent a user from executing the editing processing by mistake.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. An image processing apparatus for reading out print condition information stored in a print information file recorded on a recording medium in association with image files recorded thereon, and for controlling printing of the image file in accordance with the stored print condition information corresponding thereto, said apparatus comprising:

input means for inputting an instruction to edit one of the image files recorded on the recording medium;

discrimination means for discriminating whether the print information file recorded on the recording medium includes the print condition information corresponding to the image file for which the instruction to edit has been input;

notifying means for notifying that the print information file recorded on the recording medium includes the print condition information corresponding to the image file for which the instruction to edit has been input, in accordance with a result of discrimination by said discrimination means; and editing means for, in accordance with the instruction to edit an image file, editing the image file for which the instruction to edit has been input, wherein, in a case that said discrimination means does not discriminate that the print information file includes the print condition information corresponding to the image file, said editing means edits the image file, wherein, in a case that said discrimination means discriminates that the print information file includes the print condition information corresponding to the image file, said editing means edits not only the image file but also the corresponding print condition information included in the print information file.

2. An image processing apparatus according to claim 1, wherein said notifying means effects display to indicate that the image file for which the instruction to edit has been input is subjected to a print instruction in the print information file, in accordance with a result of discrimination by said discrimination means, and wherein the image processing apparatus further comprises confirmation means for, after said notifying means displays the indication that the image file for which the instruction to edit has been input is a print object, requesting confirmation as to whether editing of the image file for which the output has been instructed is to be carried out.

3. An image processing apparatus according to claim 1, wherein the editing of the image file is the processing of deleting the image file of interest.

4. An image processing apparatus according to claim 1, further comprising:

judging means for judging whether the image file instructed to be edited is recorded on the recording medium; and controlling means for effecting control so as to cause the editing means to execute editing processing if the judging means judges that the image file is recorded on the recording medium and to terminate the editing processing if the judging means judges that the image file is not recorded on the recording medium.

5. An image processing method of reading out print condition information stored in a print information file recorded on a recording medium in association with the image files recorded thereon, and of controlling printing of the image file in accordance with the stored print condition information corresponding thereto, said method comprising the steps of:

inputting an instruction to edit one of the image files;

discriminating whether the print information file recorded on the recording medium includes the print condition information corresponding to the image file for which an instruction to edit has been input;

notifying that the print information file recorded on the recording medium includes the print condition information corresponding to the image file for which the instruction to edit has been input, in accordance with a result of discrimination in said discriminating step; and editing, in accordance with the instruction to edit an image file, the image file for which the instruction to edit has been input, wherein, in a case that said discriminating step does not discriminate that the print information file includes the print condition information corresponding to the image file, said editing step edits the image file, and wherein, in a case that said discriminating step discriminates that the print information file includes the print condition information corresponding to the image file, said editing step edits not only the image file but also the corresponding print condition information included in the print information file.

6. An image processing method according to claim 5, wherein said notifying step includes effecting display indicating that the image file for which the instruction to edit has been input is subjected to a print instruction in the print information file, in accordance with a result of discrimination by said discriminating step, and wherein said image processing method further comprises a step of confirming whether or not editing of the image file for which the output has been instructed is to be carried out, after said notifying step displays the indication that the image file for which the instruction to edit has been input is an object to be printed.

7. An image processing method according to claim 5, wherein the editing of the image file is the processing of deleting the image file of interest.

8. A computer-readable storage medium from which information can be read out by a computer and in which a program is stored for reading out print condition information stored in a print information file recorded on a recording medium in association with image files recorded thereon, and for controlling printing of the image file in accordance with the stored print condition information corresponding thereto, said program comprising the steps of:

inputting an instruction to edit one of the image files:

discriminating whether the print information file recorded on the recording medium includes the print condition information corresponding to the image file for which an instruction to edit has been input;

notifying that the print information file recorded on the recording medium includes the print condition information corresponding to the image file for which the instruction to edit has been input, in accordance with a result of discrimination in said determining step; and editing, in accordance with the instruction to edit an image file, the image file for which the instruction to edit has been input, wherein, in a case that said discriminating step does not discriminate that the print information file includes the print condition information corresponding to the image file, said editing step edits the image file, and wherein, in a case that said discriminating step discriminates that the print information file includes the print condition information corresponding to the image file, said editing step edits not only the image file but also the corresponding print condition information included in the print information file.

* * * * *